3,085,929
HYDROXYACETATE PESTICIDE
John H. Haslam, Landenberg, Pa., assignor to E. I. du Pont de Nemours and Company, Wilmington, Del., a corporation of Delaware
No Drawing. Filed Mar. 16, 1961, Ser. No. 96,071
4 Claims. (Cl. 167—22)

This invention relates to the control of the harmful organism Gallionella and to compositions useful for such control.

The organism Gallionella has been recognized for many years as a nuisance and a serious economic problem in water wells and water storage systems. By a metabolic process Gallionella causes formation of floc deposits in its stalk. Large amounts of debris including the organism itself and the deposits are formed, and sections of this break off and block strainers, screens, nozzles and other constrictions in the system. Thus, a water well infested with Gallionella can show a gradually diminishing production due to this blockage.

Previous attempts to control Gallionella and solve its attendant problems have been unsatisfactory for various reasons. Prior treatments have had such disadvantages as being excessively corrosive to the metals of the system, of too short an effective duration, or too costly.

According to the present invention, the organism Gallionella is effectively controlled (its growth in inhibited or retarded or it is killed completely) by contacting the Gallionella organism in aqueous medium with hydroxyacetic acid. At the same time, the hydroxyacetic acid acts to break up and disperse the flock and attendant deposits which may have accumulated so that they can be flushed out, if necessary or desired.

By the treatment according to the process of this invention, free water systems can be maintained free or partially or completely blocked systems can be re-opened, cleaned, and efficient operation restored.

The hydroxyacetic acid will be used in an amount sufficient to obtain the desired control, growth inhibition or cleansing effect.

Treatment according to this invention renders the Gallionella no longer viable or inhibits its growth for a longer period than heretofore obtainable before a treatment or cleaning operation again becomes necessary. Furthermore, excessive metal corrosion is avoided.

The hydroxyacetic acid can simply be added to the aqueous system containing the Gallionella organism. An amount of hydroxyacetic acid sufficient to provide in the aqueous system a concentration by weight of from 0.1% to about 10% will provide effective control, with a preferred concentration range from 1.0% to 3.0%.

The hydroxyacetic acid can conveniently be added in the form of its sodium or potassium salts. However, hydroxyacetic acid is more effective and is therefore preferred.

The present invention is also directed to certain novel compositions useful in carrying out the above process. These compositions can be solids or aqueous liquids, and will comprise in a concentrated form suitable for marketing from 25% to 95% by weight of hydroxyacetic acid or an alkali metal salt or alkaline earth metal salt thereof, and the remainder of the composition comprising slimicides, algaecides, bactericides, water softening agents, acids such as hydrochloric or sulfuric, or mixtures of these. The compositions can also contain additional conventional water treating adjuvants, such as purifiers and the like.

In an exemplary composition particularly adapted to effect an outstandingly fast cleaning operation, a mixture of hydroxyacetic acid and hydrochloric acid is used. A preferred composition of this type includes from 1% to 5% by weight of hydroxyacetic acid, from 0.5% to 2.0% by weight hydrochloric acid, in water, and optionally a desired amount of a slimicide, algaecide or the like.

The treatment with hydroxyacetic acid according to this invention can be one step of an over-all cleaning operation. For example, if desired, it can be preceded or followed during cleaning of a water well by a treatment with a material such as a tetraphosphate to loosen clay deposits.

The practice of the present invention surprisingly results in effective control of the Gallionella and thereby effectively reduces or eliminates the formation of objectionable deposits in the water system which are characteristic of the harmful results caused by the presence of this organism.

This invention is further explained by the following illustrative examples.

*Example 1*

An industrial water well infested with Gallionella (species *G. ferruginea*) is treated by pouring down into the well 1,000 pounds of 70% aqueous hydroxyacetic acid. The pump is surged several times to effect mixing. The treated water is allowed to stand overnight. The well is then pumped out, obtaining first brownish water containing considerable quantities of Gallionella floc. Although the well prior to this treatment has produced water at a rate of only 100 gallons per minute, after the treatment it produces at a rate of 270 gallons per minute. Production continues at this high level for as long as 12 weeks without additional treatment.

By contrast, conventional treatments do not improve production as much and also production drops off to only 90 gallons per minute after a period of only 6 weeks. In addition, the hydroxyacetic acid treatment causes no appreciable harmful corrosion.

*Example 2*

Example 3 is repeated using the sodium and potassium salts of hydroxyacetic acid, using a corresponding amount on an acid equivalent basis with excellent results.

*Example 3*

A treating composition is prepared by simple admixture of the following component:

| | Percent by weight |
|---|---|
| Hydroxyacetic acid | 3.5 |
| Hydrochloric acid | 1.0 |
| Slimicide | 0.5 |

Water to make 100.0%.

This composition is added to a factory's underground water supply system, with the addition taking place at weekly intervals, in amounts sufficient to provide in the water system a concentration of acid ranging from 0.2% to 4.5% by weight. Effective control of resident Gallionella and its attendant deposits is thus obtained on a satisfactory and effective basis.

The above examples can be repeated, substituting in the illustrative formulations other ingredients disclosed above, as will be readily understood by persons skilled in the art.

The invention claimed is:
1. The method of controlling Gallionella comprising contacting said Gallionella in aqueous medium with hydroxyacetic acid in an amount sufficient to inhibit the growth of Gallionella.
2. The method of cleaning a water supply system infested with Gallionella comprising admixing with said water hydroxyacetic acid.
3. A composition comprising (1) from 25% to 95% of a compound selected from the group consisting of hydroxyacetic acid, an alkali metal hydroxyacetate and an alkaline earth metal hydroxyacetate, and (2) at least one from the group consisting of a slimicide, an algaecide and a bactericide.
4. An aqueous composition comprising from 1 to 5% by weight hydroxyacetic acid and from 0.5 to 2.0% by weight hydrochloric acid.

References Cited in the file of this patent
UNITED STATES PATENTS

| | | |
|---|---|---|
| 1,772,975 | Wieland | Aug. 12, 1930 |
| 2,269,891 | Bowen | Jan. 13, 1942 |
| 2,281,735 | Wieder | May 5, 1942 |
| 2,281,784 | Mohr | May 5, 1942 |
| 2,360,006 | Mohr | Oct. 10, 1944 |
| 2,852,426 | Stansbury | Sept. 16, 1958 |